C. H. SCHURR AND E. J. LEES.
MILLING MACHINE.
APPLICATION FILED MAY 17, 1916.
Reissued Nov. 2, 1920.
14,976.
3 SHEETS—SHEET 1.
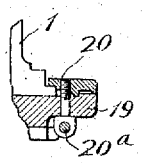
Fig. IV.
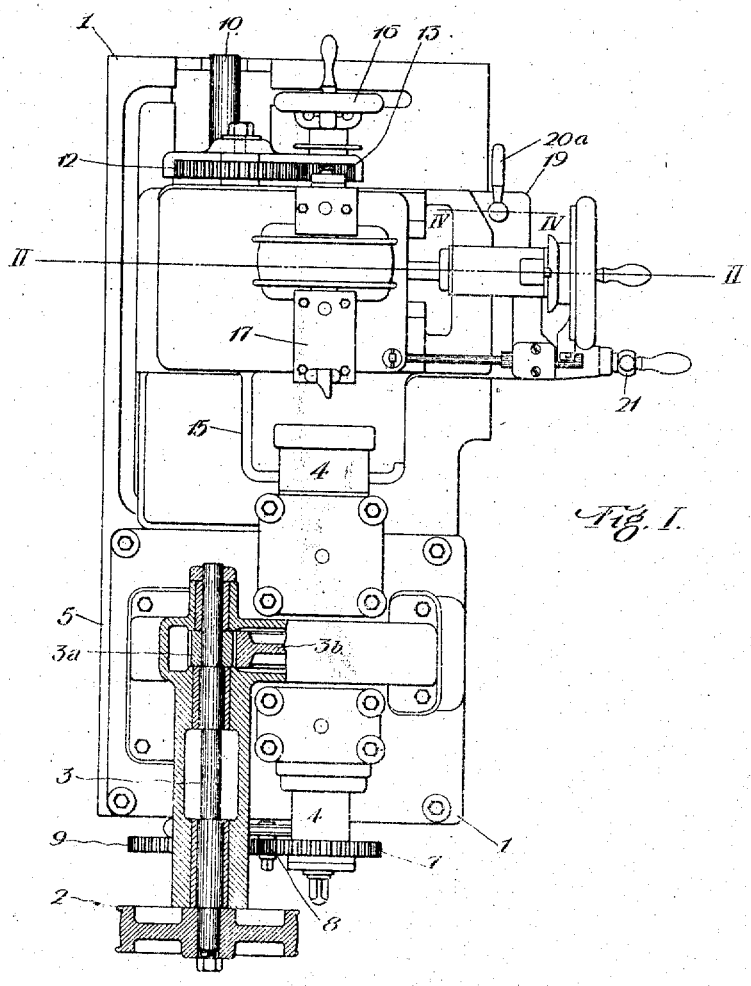
Fig. I.
Inventors:
CHARLES H. SCHURR
ERNEST J. LEES
By their atty.
Curtis R. Mueller C. H. SCHURR AND E. J. LEES.
MILLING MACHINE.
APPLICATION FILED MAY 17, 1916.
Reissued Nov. 2, 1920.
14,976.
3 SHEETS—SHEET 2.
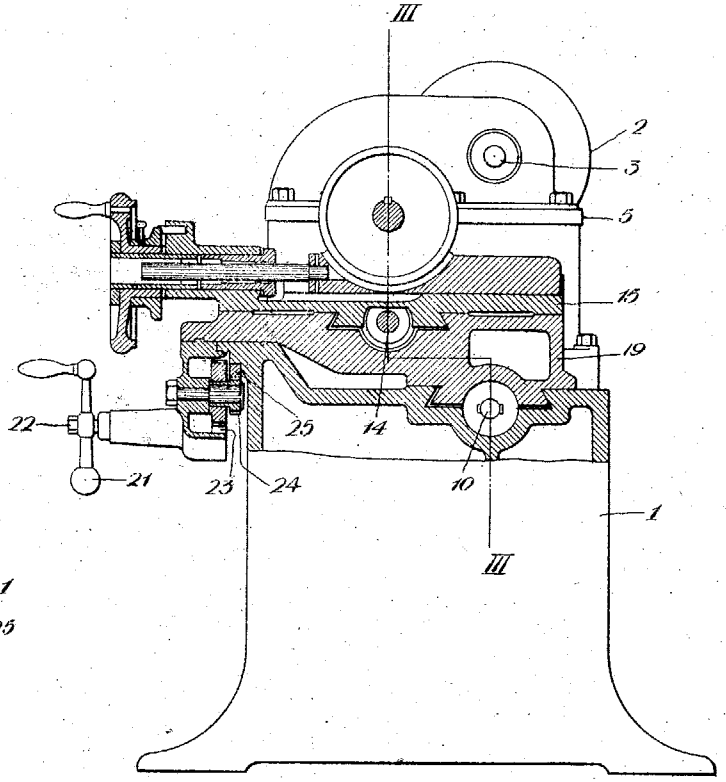
Fig. II.
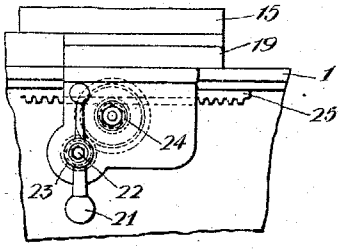
Fig. V.
Inventors:
CHARLES H. SCHURR
ERNEST J. LEES
by their atty.
Ernest R. Mueller.

C. H. SCHURR AND E. J. LEES.
MILLING MACHINE.
APPLICATION FILED MAY 17, 1916.
Reissued Nov. 2, 1920.
14,976.
3 SHEETS—SHEET 3.
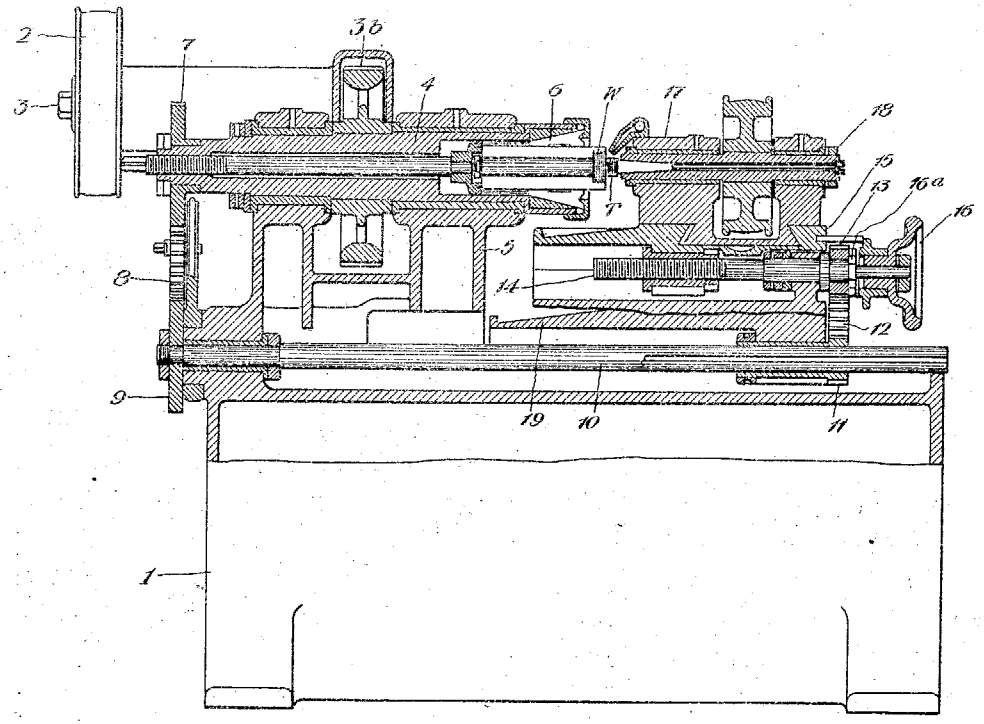
Fig. III.
Inventors:
CHARLES H. SCHURR
ERNEST J. LEES
by their atty.
Ernest B. Mueller.

UNITED STATES PATENT OFFICE.

CHARLES H. SCHURR AND ERNEST J. LEES, OF CLEVELAND, OHIO, ASSIGNORS TO THE LEES-BRADNER COMPANY, OF CLEVELAND, OHIO.

MILLING-MACHINE.

14,976. Specification of Reissued Letters Patent. Reissued Nov. 2, 1920.

Original No. 1,178,270, dated April 4, 1916, Serial No. 37,246, filed June 30, 1915. Application for reissue filed May 17, 1916. Serial No. 98,227.

*To all whom it may concern:*

Be it known that we, CHARLES H. SCHURR and ERNEST J. LEES, both citizens of the United States of America, residing at Cleveland, in the county of Cuyahoga and State of Ohio, have invented a new and useful Improvement in Milling-Machines, of which the following is a specification, the principle of the invention being herein explained and the best mode in which we have contemplated applying that principle, so as to distinguish it from other inventions.

Our invention deals with an improvement in milling machines and more particularly to the relative actuation and control of certain parts thereof.

Heretofore, so far as our knowledge extends, whenever a milling tool had concluded a given cut incident to the travel of its supporting carriage in predetermined harmonious relation to the rotation of the work spindle, it was required preparatory to a subsequent cut to reverse or release the interconnecting mechanism necessitating a release of the operative tension or torque between the several coacting parts of such mechanism. This circumstance entailed a "picking-up" action of such parts for each individual cut with consequent wear upon the parts, surprising waste of time and frequent inaccuracies.

The object of this invention is to provide an arrangement which will avoid the stated factors of demerit in a feasible and at the same time simple manner. We accomplish such object according to the exemplification of the drawings by the employment, as one part of the interconnecting mechanism, of a spline shaft along which an auxiliary slide which indirectly supports the tool carriage may be returned without disturbing the established extension which the driving parts had to assume in the beginning.

Concrete illustrations which indicate the value of our discovery may be helpful: (*a*) Owing to the avoidance of any save initial lost motion for any particular job the relative rotation of the work spindle and lead screw can be more reliably depended on. (*b*) Owing to the possible distribution of the driving contact over a longer or full section of the lead screw instead of repeatedly over some specific part thereof, absolute accuracy may be expected. (*c*) Owing to an immediately effective driving response our conception enables the operator to start the rotation and lead at the same time. The advantage of this will be clearly understood when cutting a thread in a closed bore where it is highly desirable to effect the cutting of the first thread without any error.

With the foregoing and other objects in view the invention consists of the novel construction, combination and arangement of parts as hereinafter more specifically described and illustrated in the accompanying drawings, wherein is shown an embodiment of the invention, but it is to be understood that changes, variations and modifications can be resorted to which come within the scope of the claims hereunto appended.

Adverting to the drawings: Figure I is a top plan of a milling machine embodying our invention. Fig. II is a section on line II II of Fig. I. Fig. III is a section on a zig-zag line III III of Fig. II. Fig. IV is a section of a common locking detail taken on line IV IV of Fig. I. Fig. V is a broken front elevation of certain auxiliary actuating mechanism.

Inasmuch as comparatively few parts of the machine in its entirety have any direct bearing upon the invention, designation by reference numeral in the drawings will be restricted to mention only of such as are essential to an understanding of our control of certain compound actions. In order to avoid any possible confusion it should be borne in mind moreover, that we have elected to call the members which are required to direct the "feed" and "lead" as the "tool carriage" and "longitudinally movable slide" respectively. As has been earlier stated the drawings exemplify as one feature of our invention a coacting member capable of having independent movement imparted to it and to this we will hereinafter refer as the "auxiliary slide." So, the term "lead" should be considered as that movement which is established in predetermined harmony with the rotation of the work. The term "traverse" will be employed throughout to indicate relative movement of the work and tool in a longitudinal direction, that is, parallel to the axis of the work spindle, whether effected by power or hand, but regardless of the speed of rotation of the work.

A bed 1 carries above the drive pulley 2 which effects the rotation of the shaft 3, pinion $3^a$ and gear $3^b$. The gear $3^b$ operates the work spindle 4 in the head stock 5. The work W is secured in a suitable collet 6 as clearly appears in Fig. III. The drive is communicated from the work spindle 4 through the usual chain of gears 7, 8 and 9 to another shaft 10 which in accordance with our invention is of the spline type. This latter in turn rotates a pinion 11 which meshes with an idler 12, suitably carried upon a conveniently located stud fixed to the bed and by this means drives another pinion 13 loose upon the lead screw 14 which is mounted in any approved manner for imparting longitudinal movement to a slide 15 in harmony with the rotation of the work. Such a harmonious connection or interdependent actuation between the work and tool at opposite ends of the machine is not however to be understood as essential, because, for example, the slide 15 could be traversed by power received elsewhere than from the work. At the same time, according to the exemplification of the drawings, our lead screw 14 is purposely not permanently anchored to the bed. We have enabled driving of the screw 14 by the pinion 13 through the agency of a hand wheel 16 which is not only keyed and slidably mounted upon the end of the lead screw 14, but also adapted to have a jaw clutch connection $16^a$ with the pinion 13 as appears in Fig. III. The actuation of the lead screw 14 contrives to effect the traverse of the slide 15 which supports the tool carriage 17 with its center 18 tool spindle $18^a$ and tool designated as T. By this arrangement on occasion the operator may still disengage the clutch and actuate the wheel 16 to traverse the slide 15 back again as heretofore necessitated. When however a given threading operation is unfinished such a reversal of the traverse and release of torsion makes back lash unavoidable upon resumption of the cut. This back lash occasions inaccuracies for which it is very difficult to compensate. Our invention makes it unnecessary to release such torsion in the parts regardless of the distance to be traversed. In any other machine the operator must reverse all the mechanism, or must release the driving engagement between the lead screw and the nut in which it is threaded, and thus permit back lash and loss of torsion to occur at the end of every cut. The fact that in the illustrated exemplification we have an auxiliary slide eliminates this detriment.

According to the illustrated exemplification of our invention instead of having the slide 15 feed along the bed we interpose a second or auxiliary supporting slide 19 adapted for traverse in the same general direction, as is indicated in Fig. II. This auxiliary slide 19 is operatively associated with the spline shaft 10 along which it is slidable or with reference to which it may be fixed by tightening to the bed through the agency of the well known clamp 20 having a locker lever $20^a$ shown in Figs. I and IV. It is therefore the auxiliary slide 19 and not the bed 1 which directly supports the slide 15. Hence, when the auxiliary slide 19 moves the slide 15 moves with it. When the auxiliary slide is tightened to the bed it of course constitutes in effect a part thereof. When on the other hand it is unlocked, a longitudinal traverse may be imparted thereto in the following manner: A lower hand wheel 21 turns a shaft 22, pinion 23 and compound gear 24. This latter engages with a rack 25 on the bed shown in Figs. II and V thus causing the auxiliary slide 19 to traverse and carry the pinion 11 along with it without necessitating a reversal of the driving tension either in such pinion or any other part of the mechanism for establishing the harmonious connection between the work and the lead screw 14. It will now be clear that a relative movement of the work and tool toward or away from each other may be brought about independently of any rotation of the lead screw 14, and independently of any rotation of the pinion 11, indeed, independently of the reverse rotation of any other part of the aforementioned mechanism. In this way back lash is avoided.

It is apparent that the auxiliary slide may be locked at any point preparatory to commencing or recommencing a cutting operation, and thereafter caused to more rapidly traverse in the return direction by the manipulation of the wheel 16 to bring a different section of the lead screw into working engagement. While eventually torque has to be released with our arrangement, the "picking-up" as an incident thereto is at comparatively long intervals with a pronounced saving of time and wear.

We claim:—

1. In a milling machine, the combination of a bed, a work part rotatably mounted thereon, a movable tool part, a traversing slide supporting one of said parts, means for actuating the other of said parts, mechanism synchronously connecting such other part with said slide whereby automatically to traverse the same in predetermined ratio, and an auxiliary traversing slide supporting the first mentioned slide and adapted to be fixed relative to the bed during the automatic traverse and to be loosened and bodily traversed in the reverse direction to carry

BEST AVAILABLE COPY said first mentioned slide along with it without either reversing or disconnecting said mechanism preparatory to performing a succeeding cutting operation whereby to avoid back lash during said automatic traverse.

2. In a milling machine, the combination of a bed, a work part rotatably mounted thereon, a movable tool part, a traversing slide supporting one of said parts, means for actuating the other of said parts, mechanism synchronously connecting such other part with said slide whereby automatically to traverse the same in predetermined ratio, said mechanism including a lead screw operatively engaging said slide, and an auxiliary slide interposed between said bed and first mentioned slide, said auxiliary slide being in sliding connection below with said bed and above with said first mentioned slide, said mechanism also including a spline shaft and a pinion carried by said auxiliary slide and movable along such shaft, whereby said auxiliary slide and hence said first mentioned slide and tool may be traversed without disturbing said lead screw connection.

3. In a milling machine, the combination of a work spindle, a tool spindle, a slide supporting one of said spindles, a harmonious connection including a lead screw between said slide and the other of said spindles adapted automatically to translate the rotation of the latter into a predetermined ratio of forward traverse of the slide, and a device for effecting the concerted reverse traverse of said lead screw and slide without disconnecting, or releasing the tension in, said connection.

4. In a milling machine, the combination of a work spindle, a tool spindle, a slide supporting one of said spindles, mechanism connecting said slide and the other of said spindles and adapted automatically to translate the rotation of the latter into a predetermined ratio of forward traverse of said slide, said mechanism including a pair of members capable of relative movement distinct from their coacting rotatory movement as parts of the automatic operation of such mechanism, and means for accomplishing such distinct movement whereby to traverse said slide without disconnecting or reversing any part of said mechanism.

5. In a milling machine, the combination of a work spindle, a tool center, a traversing slide supporting the latter, and mechanism including a lead screw operatively connecting said spindle and slide and adapted automatically to effect the working traverse of said slide in a given direction, means for reversing the direction of rotation of said screw to effect the idle traverse of said slide in the opposite direction, and distinct means for effecting the traverse of said slide independently of any disconnection from and independently of any rotation of said lead screw for the purpose specified.

6. In a milling machine, the combination of a bed, a work spindle and a tool spindle, a slide mounted to traverse upon such bed, means for locking said slide to the bed, a slide supporting one of said spindles and mounted to traverse upon said first mentioned slide, and a connection between the other spindle and the upper slide to automatically effect a predetermined ratio of movement therebetween, said connection including a pinion carried by said lower slide and also including a spline shaft along which said pinion may slide and with which said pinion may rotate, whereby to traverse said lower slide counter to the automatic traverse of said upper slide without release of the driving tension in said connection.

7. In a milling machine, the combination of a bed, a work part rotatably mounted thereon, a movable tool part, a traversing slide supporting one of said parts, means for actuating the other of said parts, mechanism connected with said slide whereby automatically to traverse the same, and an auxiliary traversing slide supporting the first mentioned slide and adapted to be fixed relative to the bed during the automatic traverse and to be loosened and bodily traversed in the reverse direction to carry said first mentioned slide along with it without either reversing or disconnecting said mechanism preparatory to performing a succeeding cutting operation whereby to avoid back lash during said automatic traverse.

8. In a milling machine, the combination of a bed, a spindle mounted thereon, a traversing slide supporting said spindle, mechanism connected with said slide whereby automatically to traverse the same in a given direction, said mechanism including a lead screw operatively engaging said slide, and an auxiliary traversing slide interposed between said bed and first mentioned slide and movable in the same direction as said first mentioned slide, said auxiliary slide being in sliding connection below with said bed and above with said first mentioned slide, said mechanism also including a spline shaft and a pinion carried by said auxiliary slide and movable along such shaft, whereby said auxiliary slide and hence said first mentioned slide may be traversed without disturbing said lead screw connection.

9. In a milling machine, the combination of a spindle, a longitudinally movable slide, a connection between said spindle and slide including a lead screw adapted automatically to translate rotation of the spindle into a predetermined ratio of working traverse of said slide, and a device including another longitudinally movable member for effecting the traverse of said slide without disconnecting or releasing the tension in said automatic lead screw connection.

10. In a milling machine, the combination of a bed, a spindle rotatably mounted thereon, a slide movable upon said bed, mechanism including rotating parts connected with said spindle and adapted automatically to translate its rotation into traverse of said slide substantially parallel to the axis of said spindle, said mechanism including a pair of members capable of relative movement also substantially parallel to said spindle axis and distinct from their co-acting automatic movement, another spindle rotatably mounted upon said slide, means for feeding one spindle crosswise of the other and means for tightening said members against such distinct relative movement during their automatic movement.

11. In a milling machine, the combination of a bed, a spindle, a carriage for said spindle, a slide mounted to traverse upon such bed, means for locking said slide to the bed, a slide supporting said carriage and mounted to traverse upon said first mentioned slide, and a connection with the upper slide to effect the forward traverse thereof, said connection including a pinion carried by said lower slide and also including a spline shaft along which said pinion may slide and with which said pinion may rotate, whereby to return traverse said lower slide without release of the driving tension in said connection.

12. A milling machine including a spindle, a slide, rotating mechanism connected with said spindle and adapted to translate its rotation into longitudinal traverse of said slide, and a device for effecting the idle traverse of said slide without releasing the tension in the rotating mechanism or disconnecting said mechanism from said slide.

13. A milling machine comprising a work spindle, a tool spindle, a slide supporting one of said spindles, and mechanism adapted to translate the rotation of one spindle into a traverse of the slide, said mechanism including a lead screw adapted to produce a predetermined ratio of operative traverse motion of the slide with respect to the rotation of the spindle and also including a pair of members capable of relative movement distinct from that movement of either which is coincident with the movement of the lead screw whereby the reverse traverse of the slide may be effected without rotating the lead screw or effecting its operative disconnection.

14. A milling machine including a spindle, a slide, rotating mechanism, including a lead screw connected with said spindle and adapted to translate the rotation of said spindle into a longitudinal traverse movement of said slide at a correlated rate of speed, and a device for effecting the reverse traverse movement of said slide without either disconnection from, or rotation of, said lead screw.

15. A milling machine comprising a work spindle, a tool spindle, a slide supporting one of said spindles, mechanism adapted to translate the rotation of one spindle into a longitudinal movement of said slide, said mechanism including a lead screw adapted to produce a predetermined ratio of longitudinal movement of said slide with respect to the rotation of that spindle which is not supported thereby, said mechanism also including a pair of members capable of relative movement without requiring the rotation of the lead screw whereby the reverse longitudinal movement of the slide may be accomplished without reversing the direction of rotation of said lead screw as a rotating part of said mechanism.

16. In a milling machine, the combination of a work spindle, a tool spindle, a slide supporting one of said spindles, a harmonious connection including a lead screw between said slide and the other of said spindles adapted automatically to translate the rotation of the latter into a predetermined ratio of forward traverse of the slide, and a device for effecting the reverse traverse of said slide without releasing the tension in said connection.

17. In a milling machine, the combination of a work spindle, a tool spindle, a slide supporting one of said spindles, rotating mechanism connecting said slide and the other of said spindles and adapted automatically to translate the rotation of the latter into a predetermined ratio of forward traverse of said slide, said mechanism including a pair of members capable of relative movement distinct from their coaction as parts of the automatic operation of such mechanism, the arrangement being such as to enable the occurrence of said distinct relative movement and the return traverse of said slide without reversing a rotating part of said mechanism.

18. A thread milling machine comprising the combination of a bed, a slide mounted for reciprocation thereon, rotatable work and tool milling, one of said spindles being mounted upon said bed and the other upon said slide, and mechanism including rotating members and a pair of parts adapted to have sliding association for operatively connecting said bed mounted spindle and slide whereby the rotation of the former travels the latter in a forward direction, and means for sliding one of said parts along relatively to the other whereby to travel said slide in a backward direction without loss of the torsion established in said rotating members during the forward travel of said slide.

19. In a milling machine the combination of a work spindle, a tool spindle, a slide supporting one of said spindles, mechanism connecting said slide and the other of said spindles and adapted automatically to translate the rotation of the latter into a predetermined ratio of forward traverse of said slide, said mechanism including a pair of members capable of relative movement distinct from their coaction as parts of the automatic operation of such mechanism, whereby to traverse said slide without disconnecting or reversing any part of said mechanism and means for accomplishing such distinct movement.

20. The method of milling threads which consists in rotating a work piece, effecting a distinct relative movement in one direction between said piece and a tool in predetermined ratio to the rotation of said piece, and effecting a relative movement in the opposite direction without release of the established torsion preparatory to recutting.

21. The method of milling threads which consists in rotating the work, automatically effecting a distinct relative straight line movement to cause said work and a tool to approach each other at a rate of speed in predetermined ratio to the speed of rotation of said work, and effecting a relative separating movement between said work and tool without relaxation of the established torsion preparatory to recutting.

Signed by us this eighth day of May, 1916.

CHARLES H. SCHURR.
ERNEST J. LEES.